United States Patent
Kelekar

(10) Patent No.: US 11,827,015 B2
(45) Date of Patent: Nov. 28, 2023

(54) MEDIA ASSEMBLY INCLUDING SURFACE TREATMENT

(71) Applicant: Hewlett-Packard Development Company, L.P., Spring, TX (US)

(72) Inventor: Rajesh Kelekar, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 211 days.

(21) Appl. No.: 17/311,037

(22) PCT Filed: Mar. 22, 2019

(86) PCT No.: PCT/US2019/023536
§ 371 (c)(1),
(2) Date: Jun. 4, 2021

(87) PCT Pub. No.: WO2020/197531
PCT Pub. Date: Oct. 1, 2020

(65) Prior Publication Data
US 2022/0024205 A1    Jan. 27, 2022

(51) Int. Cl.
*B41J 2/00* (2006.01)
*B41J 2/045* (2006.01)
(Continued)

(52) U.S. Cl.
CPC ............... *B41J 2/06* (2013.01); *B41J 2/045* (2013.01); *C09D 11/52* (2013.01); *G03G 9/13* (2013.01); *G03G 15/2014* (2013.01)

(58) Field of Classification Search
CPC ..... B41J 2/06; B41J 2/045; B41J 3/407; B41J 3/413; B41J 11/0015; B41J 11/002;
(Continued)

(56) References Cited

U.S. PATENT DOCUMENTS 5,451,986 A * 9/1995 Mizumoto ............... B41J 31/14
                                                    347/217
6,719,423 B2    4/2004 Chowdry et al.
(Continued)

FOREIGN PATENT DOCUMENTS

CN    205272905 U    6/2016
CN    205601425 U    9/2016
(Continued)

OTHER PUBLICATIONS

Improve Lamination Adhesion with Surface Treating, Oct. 21, 2011, Enercon Industries Corp, 2 pages, Available at: https://www.enerconind.com/web-treating/corona-treatment/library/applications/laminating-adhesion-improves-with-treatment.aspx.
Surface Treating: Promoting Adhesion, Mar. 1, 2011, Enercon Industries Corp, 5 pages, Available at: https://www.pffc-online.com/surface-prep/9271-promoting-adhesion-0301.

*Primary Examiner* — Bradley W Thies
(74) *Attorney, Agent, or Firm* — Michael Dryja

(57) ABSTRACT

A device comprising a supply, a first portion, a second portion, and a third portion. The supply is to supply a metallized, non-absorptive media along a travel path, which is electrically connectable to a ground element, the metallized media to carry a first polymer structure. The first portion along the travel path is to receive droplets of ink particles within a dielectric, non-aqueous carrier fluid on the first polymer structure on the media to form an image. The second portion is to apply an adhesion-promoting surface treatment, onto the ink particles and the first polymer structure, comprising UV ozone, plasma, or chemical additive. The third portion is to apply, via heat and pressure, a second polymer structure onto the ink particles and the first polymer structure to produce a media assembly.

15 Claims, 7 Drawing Sheets

(51) Int. Cl.
*C09D 11/52* (2014.01)
*G03G 9/13* (2006.01)
*G03G 15/20* (2006.01)
*B41J 2/06* (2006.01)

(58) Field of Classification Search
CPC ...... C09D 11/52; G03G 9/13; G03G 15/2014; G03G 15/2007; G03G 15/2021; G03G 15/6591; G03G 15/6585; B32B 15/085; B32B 15/09; B32B 27/08; B32B 27/32; B32B 2307/204; B32B 2307/4026; B32B 2307/41; B32B 2307/546; B32B 27/36; B32B 2307/202; B32B 2307/412; B32B 2307/518; B32B 2307/71; B32B 2307/7244; B32B 2307/7246; B32B 2307/732; B32B 2307/75; B32B 2439/70; B32B 3/08; B32B 15/08; B32B 27/16; B32B 2255/10; B32B 2307/748
See application file for complete search history.

(56) References Cited

U.S. PATENT DOCUMENTS

| | | |
|---|---|---|
| 9,573,349 B1 | 2/2017 | Dannhauser et al. |
| 2003/0067529 A1 | 4/2003 | May et al. |
| 2005/0095410 A1 | 5/2005 | Mazurkiewicz |
| 2005/0220518 A1 | 10/2005 | Priebe |
| 2008/0074482 A1 | 3/2008 | Makuta et al. |
| 2010/0247876 A1 | 9/2010 | Omino et al. |
| 2017/0190926 A1 | 7/2017 | De Saint-Romain |

FOREIGN PATENT DOCUMENTS

| | | |
|---|---|---|
| EP | 1186638 A1 | 3/2002 |
| EP | 1902849 A1 | 3/2008 |
| JP | H09234845 A | 9/1997 |
| JP | 2000238195 A | 9/2000 |
| JP | 2015066724 A | 4/2015 |
| JP | 2017196841 A | 11/2017 |

* cited by examiner

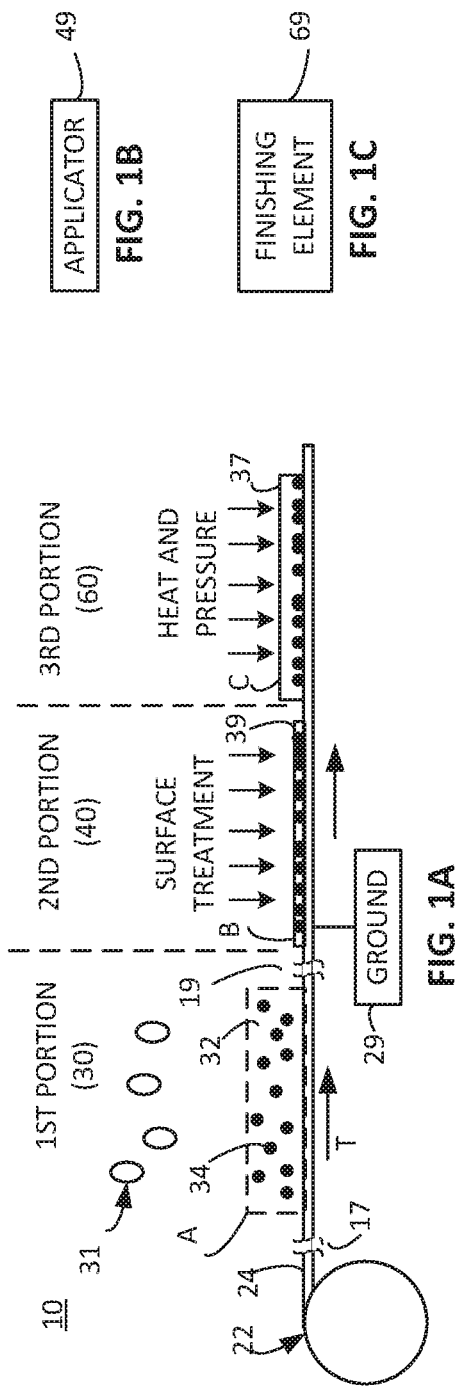
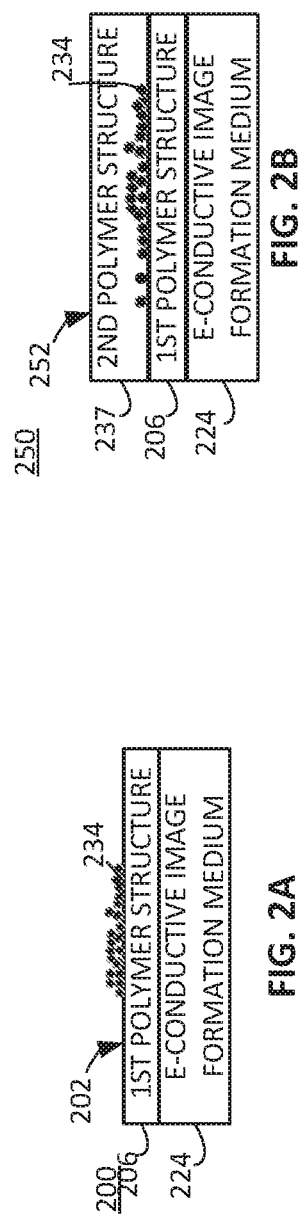

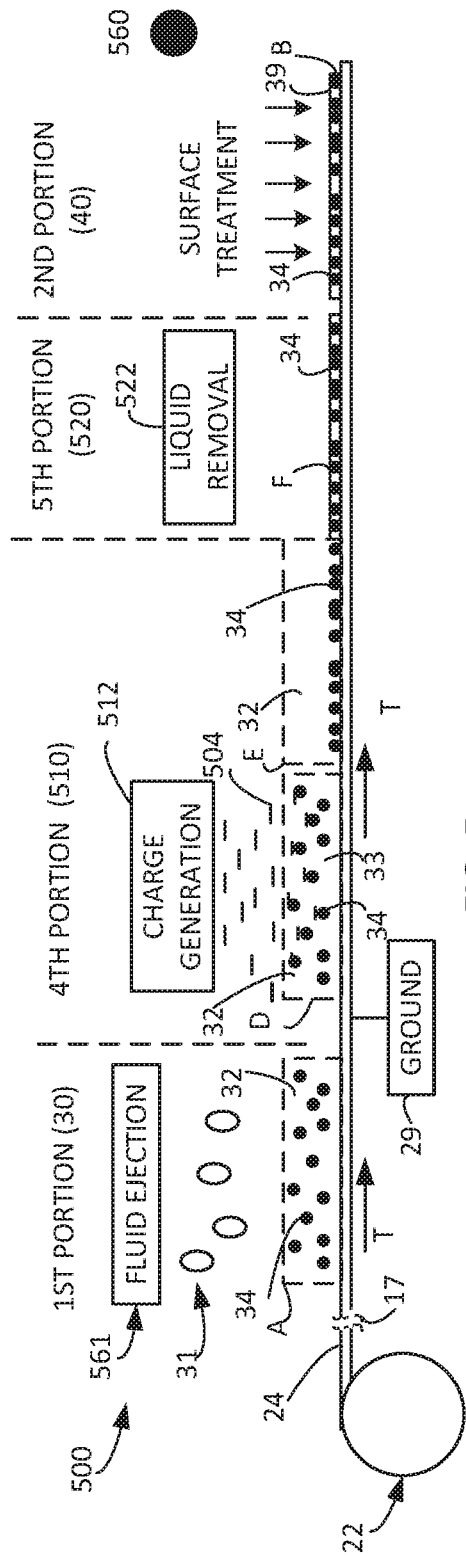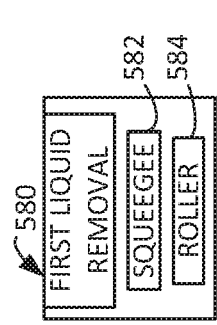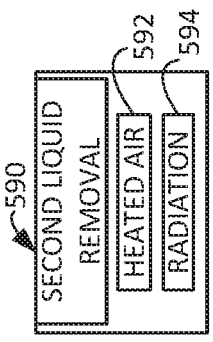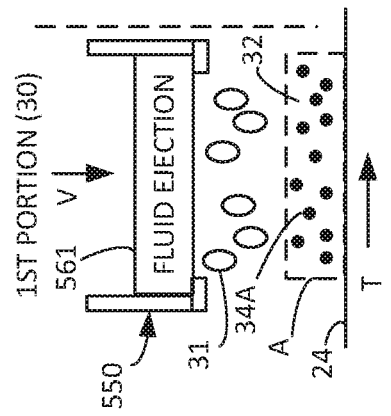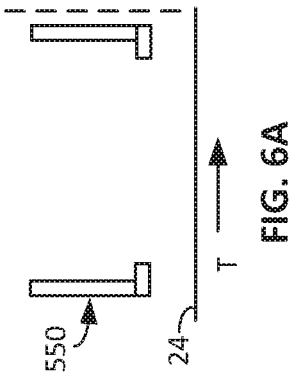

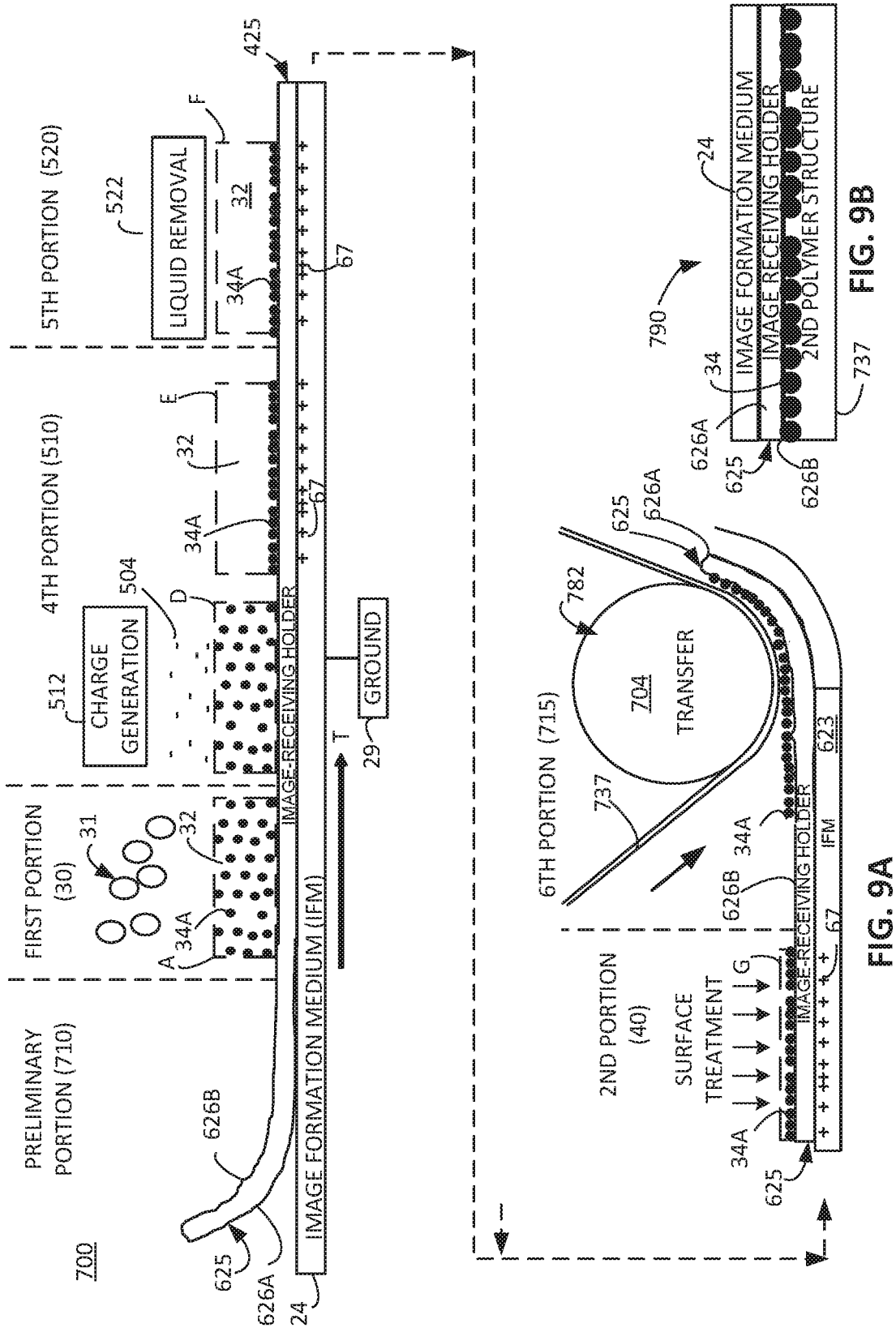

MEDIA ASSEMBLY INCLUDING SURFACE TREATMENT

BACKGROUND

Modern printing techniques involve a wide variety of media, whether rigid or flexible, and for a wide range of purposes. In some instances, the media may be combined with additional materials and/or layers to form an assembly.

BRIEF DESCRIPTION OF THE DRAWINGS

FIG. 1A is a diagram including a side view schematically representing an example image formation device and/or method of image formation.

FIG. 1B is a block diagram schematically representing an example surface treatment applicator.

FIG. 1C is a block diagram schematically representing an example finishing element.

FIG. 2A is a diagram including a side view schematically representing an example partially completed image formation medium assembly.

FIG. 2B is a diagram including a side view schematically representing an example image formation medium assembly.

FIG. 5 is a diagram including a side view schematically representing an example image formation device and/or method of image formation.

FIG. 6A is a diagram including a side view schematically representing an example receiving structure for a fluid ejection device.

FIG. 6B is a diagram including a side view schematically representing an example fluid ejection device removably inserted relative to an example receiving structure for a fluid ejection device.

FIG. 7A is a block diagram schematically representing an example first liquid removal portion.

FIG. 7B is a block diagram schematically representing an example second liquid removal portion.

FIG. 9A is a diagram including a side view schematically representing an example image formation device and/or method of image formation.

FIG. 9B is a diagram including a side view schematically representing an example image formation medium assembly.

DETAILED DESCRIPTION

Figure 3:
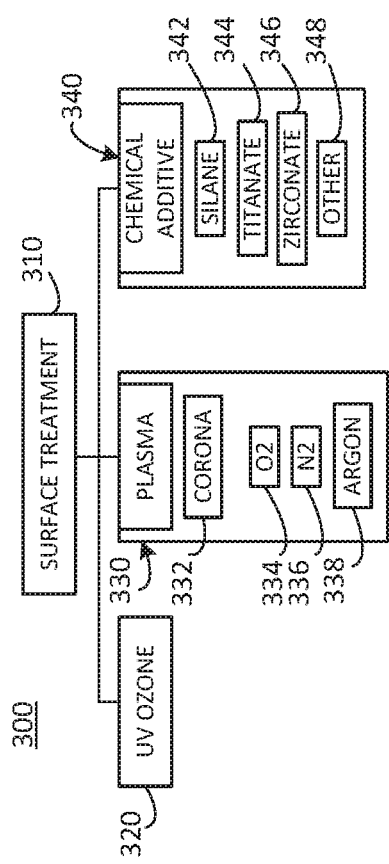
FIG. 3 is a block diagram schematically representing example surface treatment implementations.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

At least some examples of the present disclosure are directed to devices and/or methods to enhance a robustness of an image formation medium assembly, including but not limited to, increasing a peel strength by which various layers or structures of the image formation medium assembly are held together. The image formation medium assembly may sometimes be referred to as a media assembly, and an image formation medium may sometimes be referred to as a media.

In some examples, an image formation device comprises an image formation medium supply, a first portion, a second portion, and a third portion. The image formation medium supply is to supply an image formation medium along a travel path and to which a ground element is to be electrically connected. In some examples, the image formation medium may comprise an electrically conductive material and/or may comprise an electrically conductive layer, such as a metal backing layer or metallized layer. In some such examples, the electrically conductive image formation medium (e.g. the metallized media) is to carry a first polymer structure thereon.

The first portion along the travel path is to receive droplets of ink particles within a dielectric carrier fluid onto the media to form at least a portion of an image on the image formation medium. The second portion is to apply an adhesion-promoting surface treatment onto the first polymer structure (including the ink particles thereon), with the surface treatment comprising UV ozone, plasma, or chemical additive, in some examples. The third portion is located downstream from the second portion and is to apply a second polymer structure onto the surface-treated first polymer structure (and ink particles) to produce an image formation medium assembly. In some examples, the application of the second polymer may be performed via heat and pressure, such as via lamination or similar actions.

In at least some examples, the surface treatment may act to increase the peel strength and overall robustness of the completed image formation medium assembly.

As previously noted above, in some examples, prior to receiving the droplets of ink particles within the carrier fluid, a first polymer structure may formed on the image formation medium. The first polymer structure may be formed from a single layer or from multiple layers, each of which may different properties and/or functions or each of which may have some of the same properties and/or functions. In some examples, at least a portion of the first polymer structure may comprise an electrically charged, binder layer, which may sometimes be referred to as an image receiving holder as further described later. In some such examples, the image receiving holder comprises a top layer of the first polymer structure. The image receiving holder may facilitate electrostatic attraction and fixation (e.g. pinning) of ink particles relative to the image formation medium, as also further described later. In some such examples, the image formation medium may comprise an electrically conductive (i.e. e-conductive) material to facilitate the electrostatic attraction and fixation, and to which the above-mentioned ground element may be connected. In some such examples, the electrically conductive material may comprise a metal material or metallized layer.

In some examples, the image formation device may sometimes be referred to as a printer or printing device. In some examples in which a media is supplied in a roll-to-roll arrangement or similar arrangements, the image formation device may sometimes be referred to as a web press and/or the media can be referred to as a media web.

At least some examples of the present disclosure are directed to forming an image directly on an image formation medium, such as without an intermediate transfer member. Accordingly, in some instances, the image formation may sometimes be referred to as occurring directly on the image formation medium. However, this does not necessarily exclude some examples in which an additive layer(s) (e.g. first polymer structure) may be placed on the image formation medium prior to receiving ink particles (within a carrier fluid) onto the media. In some instances, the image formation medium also may sometimes be referred to as a non-transfer media to indicate that the image formation medium itself does not comprise a transfer member (e.g. transfer blanket, transfer drum) by which an ink image is to be later transferred to another media (e.g. paper or other material). In this regard, the image formation medium may sometimes also be referred to as a final image formation medium or a media product. In some such instances, the image formation medium may sometimes be referred to as product packaging media or product packaging image formation medium. Similarly, after application of a second polymer structure (as described above), via heat and pressure, a completed image formation medium assembly may sometimes be referred to as a product packaging, image formation medium assembly or a product packaging media assembly.

In some examples, the image formation medium comprises a non-absorbing image formation medium. Stated differently, in some examples the image formation medium is made of a material which does not absorb liquids, such as a carrier fluid and/or other liquids in the droplets received on the image formation medium. In one aspect, in some such examples the non-absorbing image formation medium does not permit the liquids to penetrate, or does not permit significant penetration of the liquids, into the surface of the non-absorbing image formation medium.

Via the example arrangements, the example device and/or associated methods can print images on a non-absorbing image formation medium (or some other media) with minimal bleeding, dot smearing, etc. while permitting high quality color on color printing. Moreover, via these examples, image formation on a non-absorbing image formation medium (or some other media) can be performed with less time, less space, and less energy at least due to a significant reduction in drying time and capacity. These example arrangements stand in sharp contrast to other printing techniques, such as high coverage, aqueous-based step inkjet printing onto non-absorbing media for which bleeding, dot smearing, cockling, etc. may yield relatively lower quality results, as well as unacceptably high cost, longer times, etc. associated with drying.

In some examples, the first portion of the image formation device comprises a receiving structure to receive a fluid ejection device with the fluid ejection device to deliver the droplets of ink particles within the dielectric carrier fluid on the media to form at least a portion of an image on the media. In some examples, the droplets may sometimes be referred to as being jetted onto the media. With this in mind, example image formation according to at least some examples of the present disclosure may sometimes be referred to as "jet-on-media" or "jet-on-substrate." In some examples, the fluid ejection device is to eject/deposit the dielectric carrier fluid on the media as a non-aqueous fluid. In some examples, the non-aqueous fluid comprises an isoparafinic fluid or other oil-based liquid suitable for use as a dielectric carrier fluid.

These examples, and additional examples, will be further described below in association with at least FIGS. 1A-13.

FIG. 1A is a diagram including a side view schematically representing an example image formation device 10 and/or example image formation method.

As shown in FIG. 1A, in some examples an image formation device 10 comprises an image formation medium supply 22, a first portion 30, and a second portion 40. The image formation medium supply 22 is to supply image formation medium 24 along a travel path T and to which a ground element 29 is electrically connectable. In some examples, image formation medium supply 22 may comprise a roll of image formation medium which is fed and moved along travel path T via support from an array of rollers to maintain tension and provide direction to the image formation medium along travel path T. In some instances, the image formation medium may be referred to as a media and the image formation medium supply 22 may sometimes be referred to as a media supply.

In some examples, image formation medium 24 comprises an electrically conductive (e.g. e-conductive) material, such as but not limited to a metallized material, layer, or foil to which a ground element 29 is electrically connected. In some instances, the image formation medium 24 may be referred to as a metallic media or metalized media. In some examples, an electrically conductive element separate from the e-conductive image formation medium 24 is provided to contact the image formation medium 24 in order to implement grounding of the image formation medium 24. In some examples, the electrically conductive element may comprise a roller or plate in rolling or slidable contact, respectively, with a portion of the image formation medium. In some examples, the ground element 29 is in contact with an edge or end of the image formation medium. In some examples, the electrically conductive element may take other forms, such as a brush or other structures. Accordingly, it will be understood that the ground element 29 is not limited to the particular location shown in FIGS. 1A, 5, and 9A-11.

In some such examples, the non-absorptive image formation medium 24 may comprise other attributes, such as acting as a protective layer for items packaged within the image formation medium. Such items may comprise food or other sensitive items for which protection from moisture, light, air, etc. may be desired.

With this in mind, in some examples the image formation medium 24 may comprise a plastic media. In some examples, the image formation medium 24 may comprise polyethylene terephthalate (PET) material, which may comprise a thickness on the order of about 10 microns. In some examples, the image formation medium 24 may comprise a biaxially oriented polypropylene (BOPP) material. In some examples, the image formation medium 24 may comprise a biaxially oriented polyethylene terephthalate (BOPET) polyester film, which may be sold under trade name Mylar in some instances. In some such examples of using PET or BOPP or BOPET or similar materials, the image formation medium 24 also may comprise a metal backing layer to provide electrical conductivity.

With this in mind, in some examples, the image formation medium 24 may comprise additional types or other types of materials which provide at least some of the features and attributes as described throughout the examples of the present disclosure. For examples, the image formation medium 24 or portions of image formation medium 24 may comprise a metallic component, such as a metallized foil, metal layer, etc. among other types of materials. The metal component may act as a moisture and oxygen barrier to protect the safety and freshness of the food or to protect other attributes of sensitive non-food contents. In some examples, the metallic component of the image formation medium 24 and/or other components of the image formation medium 24 may be present as part of the image formation medium supply 22, while in some examples, such components may be added after or as the image formation medium 24 is released from the supply 22.

As shown in FIG. 1A, in some examples the first portion 30 of image formation device 10 is located along and/or forms a portion of the travel path T, and is to receive droplets 31 of ink particles 34 within a dielectric carrier fluid 32 on the image formation medium 24. The depiction within the dashed lines A in FIG. 1A represents ink particles 34 within carrier fluid 32 after being received on image formation medium 24 to form at least a portion of an image on the image formation medium 24. In some examples, the droplets 31 from which ink particles 34 are formed may comprise pigments, dispersants, and the carrier fluid 32.

As further shown by the curved break lines 17 along travel path 7, in some examples the image formation device (and/or method) may comprise portions or action preceding the first portion 30. Similarly, as further shown by the curved break lines 19 along travel path T, in some examples the image formation device (and/or method) may comprise portions or action following the first portion 30 and preceding the second portion 40.

As shown in FIG. 1B, the second portion 40 may comprise an applicator 49 to apply a surface treatment to the layer of ink particles 34 and image formation medium 24, the surface treatment promoting adhesion between at least the image formation medium 24 (and ink particles 34 thereon) and subsequently applied layers or structures, such as a second polymer structure 237 or cover layer, as further described below with respect to third portion 60 of image formation device 10. In some examples, as later shown in at least FIGS. 2A-2B, the surface treatment is applied to a first polymer structure 206 and ink particles 34 (on image formation medium 24) to promote adhesion between the second polymer structure 237 relative to the combined structure of the first polymer structure (e.g. 206 in FIG. 2B) and ink particles 34 (on the first polymer structure), and thereby increase the peel strength of a completed image formation medium assembly.

In some examples, the applicator 49, a portion of applicator 49, or materials used with the applicator 49 may be considered a consumable and as such the second portion 40 may be considered to receive the applicator 49, a portion of the applicator 49, or materials used with the applicator 49.

Further details regarding at least some example implementations of the surface treatment applied in second portion 40 are further described later in association with at least FIG. 3.

As shown in FIG. 1A, the third portion 60 is to receive a structure (e.g. second polymer structure, cover layer, etc.) and receive heat and pressure by which the cover structure is applied onto the partially formed image formation medium assembly, which includes a layer of ink solids (from the ink particles) in the pattern of an image, in order to produce a completed image formation medium assembly. As previously noted, in some examples the cover structure is applied on a first polymer structure and the ink particles, both carried on an image formation medium.

As shown in FIG. 1C, the third portion 60 may comprise a finishing element 69 to provide a cover structure (e.g. layer) and/or to apply heat and pressure. At least some aspects of example implementations of finishing element 69 are later described in association with sixth portion 715 in association with at least FIGS. 9A, 10.

In examples, the finishing element 69, a portion of finishing element 69, or materials used with the finishing element 69 may be considered a consumable and as such the third portion 60 may be considered to receive the finishing element 69, a portion of the finishing element 69, or materials used with the finishing element 69.

It will be understood that in some examples, prior to the finishing action(s) in third portion 60, the image formation device 10 may comprise a charge generation portion to cause electrostatic fixation of the ink particles relative to the image formation medium 24 and/or the image formation device 10 may comprise a liquid removal portion to remove excess liquid (e.g. primarily carrier fluid) and dry the ink particles on the image formation media. At least some such example implementations are described later in association with at least FIGS. 5, 7A-7B, 9A, 10-11.

In some such examples, via such electrostatic fixation of the ink particles, strong adhesion may be achieved of the ink particles relative to the image formation medium 24 (and any layers thereon). Accordingly, in at least some examples, it may be undesirable and/or unnecessary to apply one of the example surface treatments prior to depositing the ink particles 34 onto at least the image formation medium 24. However, in at least some examples, one of the example surface treatments may be applied to the electrostatically fixed, ink particles 34 and first polymer structure (e.g. 206) on an image formation medium 24 in order to substantially increase the adhesion (e.g. peel strength) of a second polymer structure 237 relative to a combined structure of the ink particles 34 and the first polymer structure 206.

In some examples, prior to receiving the droplets 31 of ink particles 34 within the carrier fluid 32, a first polymer structure 206 may be formed on an image formation medium 224 (like image formation medium 24), such as shown in the diagram 200 in FIG. 2A of an at least partially formed image formation medium assembly 202. The first polymer structure 206 may be formed from a single layer or from multiple layers, each of which may different properties and/or functions or each of which may have some of the same properties and/or functions. In some examples, at least a portion of the first polymer structure 206 may comprise an electrically charged, binder layer, which may sometimes be referred to as an image receiving holder as further described later in association with at least FIGS. 8A-9B. The image receiving holder may facilitate electrostatic attraction and fixation (e.g. pinning) of ink particles 34 relative to the media, as also further described later. With this in mind, in some such examples, the image formation medium may comprise a metallic material or metallized layer to facilitate the electrostatic attraction and fixation, and to which the above-mentioned ground element 29 may be connected.

As further shown in FIGS. 1A and 2B, in some examples via third portion 60 a second structure (37 in FIG. 1A, 237 in FIG. 2B) is applied on top of the dried, ink particles 34 and image formation medium 24 via heat and pressure such as via lamination or otherwise secured onto the partially formed image formation medium assembly to produce a completed image formation medium assembly 252 as shown in the diagram 250 of FIG. 2B. In some examples, the second structure may comprise a polymer structure. Moreover, as further described below, the image formation medium 24 in FIG. 1A also may comprise or carry additional materials, layers, such as a first polymer structure 206 shown in FIG. 2A.

With further reference to FIG. 2B, in some examples the completed assembly 252 comprises the electrically conductive image formation medium 224, the surface-treated first polymer structure 206 and layer of ink solids 234, and second polymer structure 237 covering the layer of ink solids 234.

In some examples, the completed image formation medium assembly 252 may be used in the flexible packaging market. In some examples, such flexible packaging may comprise food packaging. In some such examples of food packaging, the image formation medium 224 of completed assembly 252 may face or enclose the food contained with the package formed from completed assembly 252. Meanwhile, the second polymer structure (e.g. cover layer) may face or be exposed to the consumer, user, etc. In some such examples, this additional outer cover layer 237 can be transparent.

FIG. 3 is block diagram schematically representing example surface treatment implementations 300. In some examples, at least one of the example implementations may comprise the surface treatment previously described in association with second portion 40 (FIG. 1A) and/or applicator 49 (FIG. 1B).

In general terms, at least some example methods apply an adhesion-promoting surface treatment to a printed layer of ink solids and first polymer structure (on an image formation medium) prior to application of a second polymer structure (or other cover layer) onto the printed layer of ink solids and first polymer structure in order to increase a peel strength of a completed image formation medium assembly.

As shown at 320 in FIG. 3, in some examples one example surface treatment comprises a UV ozone surface treatment. In some such examples, among other aspects of the surface treatment, the UV ozone effectively removes organic components which otherwise may inhibit adhesion of a first polymer structure, such as organic components associated with a dispersant within the carrier fluid 32 (within which the ink particles 34 are deposited). In some aspects, such dispersants may be highly viscous liquids and inhibit adhesion of first polymer structure 206 (with layer of ink solids 34 thereon) relative to the second polymer structure 237. It will be understood that at this stage, the ink particles 34 have already been electrostatically pinned relative to the first polymer structure 206 and/or image formation medium 24. Accordingly, application of a surface treatment 310 (FIG. 3), such as in second portion 40 in FIG. 1A, is not used to prepare a surface of first polymer structure 206 prior to printing ink onto the first polymer structure. Rather, the application of the surface treatment 310, after the ink particles 34 are secured to the first polymer structure 206 and image formation medium 24, serves primarily to increase a peel strength of a completed image formation medium assembly.

Because it's high reactivity to at least some organic materials, such as the dispersants, application of UV ozone surface treatment causes such organic materials to react with the air during the UV ozone surface treatment, which causes such materials (and/or reactive byproducts) to be released as a gas. Accordingly, the UV ozone treatment acts to remove dispersants and also may modify the surface (to which it is applied) regarding its chemical functionality or surface morphology (e.g. crystallinity), which such actions promoting adhesion as described above.

In some such examples of UV ozone treatment, the UV ozone treatment comprises exposing at least the first polymer structure 206 and ink particles 34 to a low pressure mercury lamp in atmospheric conditions. In some examples, a distance between the lamp and the surface-to-be-treated is on the order of 5 mm. In some examples, the UV radiation emitted from the lamp may comprise wavelengths within a range of about 180 to about 190 nm and/or within a range of about 250 to about 260 nm. In some such examples, the wavelength may be on the order of 185 nm (e.g. 184.8, 184.9, 185, 185.1, 185.2) and 254 nm (e.g. 253.8, 253.9, 254, 254.1, 254.2). In some examples, radiation emitted in wavelengths within the vacuum ultraviolet (VUV) range and/or within the ultraviolet C (UVC) may be used. Via at least some of these example UV ozone parameters and/or other UV ozone parameters, an example UV ozone surface treatment may create reactive oxygen species and photodissociate organic components, which in turn leads to the above-described surface modification and removal of organic components.

As shown at 330 in FIG. 3, in some examples one example surface treatment comprises a plasma surface treatment. In some such examples, the plasma surface treatment may comprise specific plasma modalities, such as but not limited to, one of corona discharge 332, oxygen (O2) 334, nitrogen (N2) 336, or argon 338. In some examples, the plasma surface treatment 330 employs an atmospheric corona discharge, which acts to ionize the surrounding air, resulting in charged or radicalized gas species (e.g. O, N, etc.) either reacting with or bombarding the target surface. In at least some example implementations of the plasma surface treatment, the partially formed image formation medium assembly, such as shown in FIG. 2A), is exposed to a plasma to cause a gas (e.g. air, oxygen, nitrogen, argon) to react with a material on the partially formed image formation assembly, such as but not limited to the residual dispersants which were present in the carrier fluid 32 of droplets 31. In some examples, the plasma surface treatment may be performed under vacuum conditions, while in some examples, the plasma surface treatment may be performed under atmospheric conditions. The plasma surface treatment may change the crystallinity of the surface (e.g. first polymer structure) and/or remove or chemically modify the dispersants to thereby significantly increase adhesion of the second polymer structure 237 relative to the combined structure of the first polymer structure 206 and ink particles 34 (on the first polymer structure) to form a completed image formation medium assembly (FIG. 2B).

As shown at 340 in FIG. 3, in some examples one example surface treatment comprises a chemical additive treatment. In at least some such examples, the chemical additive treatment 340 may significantly enhance adhesion between two relatively similar materials, such as the second polymer structure 237 (FIG. 2B) relative to the combined structure of the ink particles 34 on first polymer structure 206. In some such examples, the surface treatment may comprise specific chemical additives, such as one of silane 342, titanate 344, zirconate 346, or other chemical additives 348. Such materials may be applied as a single layer or as multiple layers. In some examples, the silane material may be applied via silanization. In some such examples, the chemical additive 430 may act as a chemical bridge to increase adhesion of the second polymer structure (e.g. 237 in FIG. 2B) relative to the combined structure of the first polymer structure (e.g. 206 in FIG. 2B) and ink particles 34 (on the first polymer structure).

In a manner similar to that described for the UV ozone treatment and/or plasma treatment, the chemical additive is applied as a surface treatment after the ink particles 34 have been printed (and secured via electrostatic pinning, and cold liquid removal) relative to the first polymer structure 206. Accordingly, the peel-strength increasing properties (arising from the surface treatment) via chemical additives is directed to promoting adhesion between the second polymer structure (e.g. 237 in FIG. 2B) and the combined structure of the first polymer structure (e.g. 206 in FIG. 2A, 2B) and layer of ink solids 34 (on the first polymer structure.

In some such examples, the chemical treatment may increase adhesion via removing dispersants and/or enhancing chemical functionality on the surface of the ink particles 34 and first polymer structure 206 in order to better adhere the second polymer structure 237.

In some examples, via application of the surface treatment in second portion 40, the image formation medium assembly may exhibit (between the second polymer structure 237 and the first polymer structure 206 supported by image formation medium 224) a substantially increased peel strength as compared to a peel strength of a similar image formation medium assembly lacking such surface treatment. In some such examples, this "substantial increase" comprises about 100 percent (e.g. 99.8, 99.9, 100, 100.1, 100.2) increase in peel strength. In some examples, the substantially increased peel strength may be: at least about 35 percent (e.g. 34.8, 34.9, 35, 35.1, 35.2); at least about 40 percent (e.g. 39.8, 39.9, 40, 40.1, 40.2); at least about 45 percent (e.g. 44.8, 44.9, 45, 45.1, 45.2); at least about 50 percent (e.g. 49.8, 49.9, 50, 50.1, 50.2); at least about 55 percent (e.g. 54.8, 54.9, 55, 55.1, 55.2); at least about 60 percent (e.g. 59.8, 59.9, 60, 60.1, 60.2); at least about 65 percent (e.g. 64.8, 64.9, 65, 65.1, 65.2); at least about 70 percent (e.g. 69.8, 69.9, 70, 70.1, 70.2); at least about 75 percent (e.g. 74.8, 74.9, 75, 75.1, 75.2); at least about 80 percent (e.g. 99.8, 99.9, 100, 100.1, 100.2); at least about 85 percent (e.g. 84.8, 84.9, 85, 85.1, 85.2); at least about 90 percent (e.g. 99.8, 99.9, 100, 100.1, 100.2); at least about 95 percent (e.g. 94.8, 94.9, 95, 95.1, 95.2); and at least about 100 percent.

Figure 4:
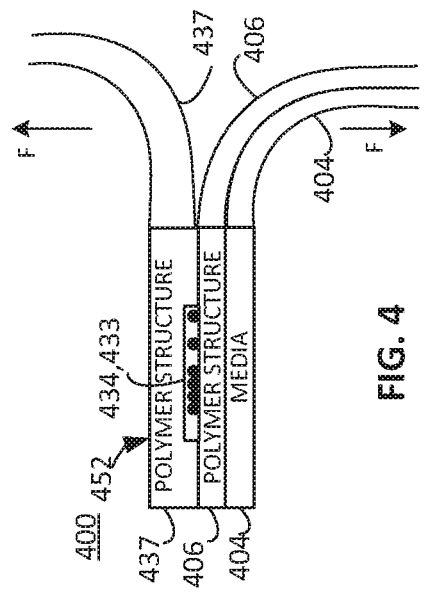
FIG. 4 is a diagram including a side view schematically representing a peel strength test applied to a media assembly made by an example image formation device and/or example image formation method.

In some examples, the peel strength is measured via tensile tester (e.g. Instron) as illustrated in FIG. 4 in which the second polymer structure 437 and the remaining portions are pulled part from each other by a force F. In some examples, such pull test is implemented at 5 millimeter-per-second pull rate. In some examples, the force F to cause peeling-apart of the first and second polymer structures 206, 237 may be on the order of 20-25 N/inch when the applied surface treatment is a UV ozone treatment. In contrast, the force F may be on the order of 10 N/inch when no surface treatment (e.g. UV ozone) is applied. Accordingly, as noted above the surface treatment may produce a substantial increase in the peel strength between the first and second polymer structures 206, 237.

In some examples, the surface treatment may modify the optical properties (e.g. opacity, density, etc.) the complete image formation medium assembly by no more than about 5 percent.

FIG. 5 is a diagram including a side view schematically representing an example image formation device 500 and/or aspects of an example image formation method. In some examples, device 500 comprises at least some of substantially the same features and attributes as device 10 previously described in association with FIGS. 1A-4.

As shown in FIG. 5, the image formation device 500 comprises an image formation medium supply 22, first portion 30, second portion 40 having substantially the same features and attributes as in device 10 in FIG. 1A.

With further reference to FIG. 5, in some examples, the first portion 30 of image formation device 500 comprises a fluid ejection device 561 to eject the droplets 31 of ink particles 32 within the carrier fluid 32. The fluid ejection device 561 is positionable at a location spaced apart and above the image formation medium 24. In some examples, the fluid ejection device 561 comprises a drop-on-demand fluid ejection device. In some examples, the drop-on-demand fluid ejection device comprises an inkjet printhead. In some examples, the inkjet printhead comprises a piezoelectric inkjet printhead. In some examples, the fluid ejection device 100 may comprise other types of inkjet printheads, such as but not limited to thermal inkjet printheads.

In some examples, as further described later in association with at least FIG. 12A, among directing other and/or additional operations, a control portion 1000 is to instruct or to cause the fluid ejection device 561 (FIG. 5) to deliver the droplets 31 of ink particles 34 (and dispersants) within the dielectric carrier fluid 32 onto the image formation medium 24, such as within the first portion 30 along the travel path T of the image formation medium 24.

As further shown in FIG. 6A, in some examples the first portion 30 of the example image formation devices 10, 500 may comprise a receiving structure 550 to removable receive the fluid ejection device 561, such as in some examples in which the fluid ejection device 561 is removably insertable into the receiving structure 550. The receiving structure 550 is sized, shaped, and positioned relative to image formation medium 24, as well as relative to other components of an image formation device (e.g. 10, 500, etc.) such that upon removable insertion relative to receiving structure 550 (as represented by arrow V), the fluid ejection device 561 is positioned to deliver (e.g. eject) the droplets 31 of ink particles 34 (and at least dispersants) within dielectric carrier fluid 32 onto image formation medium 24, as shown in FIG. 6B. In some such examples, the fluid ejection device 561 may comprise a consumable which is periodically replaceable due to wear, exhaustion of an ink supply, etc. In some such examples, the fluid ejection device 561 may be sold, supplied, shipped, etc. separately from the rest of the image formation device and then installed into the image formation device upon preparation for use of image formation device at a particular location. The receiving structure 550 may sometimes be referred to as a receptor.

With further reference to at least FIGS. 1A, 6A, 6B, in some examples, as part of ejecting droplets (e.g. 31 in FIG. 5), the fluid ejection device 561 is to deposit the dielectric carrier fluid 32 on the image formation medium 24 as a non-aqueous liquid. In some examples, the non-aqueous liquid comprises an isoparafinic fluid, which may be sold under the trade name ISOPAR. In some such examples, the non-aqueous liquid may comprise other oil-based liquids suitable for use as a dielectric carrier fluid.

As further shown in FIG. 5, in some examples, the image formation device 10 also comprises a fourth portion 510 which is located downstream along the travel path T from the first portion 30 and upstream from the second portion 40 in which an example surface treatment takes place.

As shown in FIG. 5, the fourth portion 510 comprises a charge generation portion 512 to emit airborne charges 504 to charge the ink particles 34, as represented via the depiction in dashed lines D in FIG. 5. Once charged, the ink particles 34 move, via attraction relative to the grounded image formation medium 24, through the carrier fluid 32 toward the image formation medium 24 to become electrostatically fixed (i.e. pinned) relative to the image formation medium 24, as represented via the depiction in dashed lines E in FIG. 1A. Via such pinning and the later described removal of excess liquid (e.g. carrier fluid 32), the pinned ink particles 34 (e.g. pigments) form a layer of ink solids in a pattern corresponding to an image to be formed on the image formation medium. As further shown within dashed lines E, the carrier fluid 32 becomes supernatant with respect to the layer of ink solids electrostatically pinned relative to image formation medium 24.

As previously noted elsewhere, when a layer(s) is formed in image formation medium 24 prior to receiving droplets 31, then the ink particles 34 also may be considered to be electrostatically pinned relative to such layer (e.g. first polymer structure 206) on the image formation medium 24, 224.

With further reference to FIG. 5, in some examples the charge generation device 512 in the third portion 510 may comprise a corona, plasma element, or other charge generating element to generate a flow of charges. The generated charges may be negative or positive as desired. In some examples, the charge generation device 512 may comprise an ion head to produce a flow of ions as the charges. It will be understood that the term "charges" and the term "ions" may be used interchangeably to the extent that the respective "charges" or "ions" embody a negative charge or positive charge (as determined by device 512) which can become attached to the ink particles 34 to cause all of the charged ink particles to have a particular polarity, which will be attracted to ground. In some such examples, all or substantially all of the charged ink particles 34 will have a negative charge or alternatively all or substantially all of the charged ink particles 34 will have a positive charge.

Via such example arrangements, the charged ink particles 34 become electrostatically fixed on the image formation medium 24 in a location on the image formation medium 24 generally corresponding to the location (in an x-y orientation) at which they were initially received onto the image formation medium 24 in the first portion 30 of the image formation device 10. Via such electrostatic fixation, the ink particles 34 will retain their position on image formation medium 24 even when other ink particles (e.g. different colors) are added later, excess liquid is physically removed, etc. It will be understood that while the ink particles may retain their position on image formation medium 24, some amount of expansion of a dot (formed of ink particles) may occur after the ink particles 34 (within carrier fluid 32) are jetted onto image formation medium 24 and before they are electrostatically pinned. In some examples, the charge generation device 512 is spaced apart by a predetermined distance (e.g. downstream) from the location at which the droplets are received (or ejected) in order to delay the electrostatic fixation (per operation of charge generation device 512), which can increase a dot size on image formation medium 24, which in turn may lower ink consumption.

With further reference to FIG. 5, in some examples image formation device 500 comprises a fifth portion 520, including a liquid removal element 522, downstream along the travel path T from the charge generation portion 512 (in fourth portion 510) to remove at least a portion of the carrier fluid 32 (and any other excess liquids) from the image formation medium 24. As shown in FIG. 5, a fifth portion 520 also may be located upstream from second portion 40. In some examples, the liquid removal element 522 is to remove the carrier fluid 32 without heating the fluid 32 at all or without heating the carrier fluid 32 above a predetermined threshold. In some instances, such liquid removal may sometimes be referred to as cold liquid removal by which the liquid is removed at relatively cool temperatures, at least as compared to high heat drying techniques. Among other aspects, this arrangement may significantly reduce drying time, space used for drying, and/or costs associated with drying. In some such examples, a mechanical element (e.g. squeegee roller) of the liquid removal element 522 may slightly heat the carrier fluid 32 and/or other liquid without using heat as a primary mechanism to remove the carrier fluid 32 from the ink particles 34 on image formation medium 24.

As previously noted, once the ink particles 34 become pinned against image formation medium 24 as shown in dashed lines E at least FIG. 5, the carrier fluid 32 exhibits supernatant-like behavior by its suspension above the layer of ink particles 34 pinned against the image formation medium 24. Accordingly, this arrangement in fifth portion 520 facilitates mechanical removal of such supernatant liquid without disturbing the pinned ink particles 34.

As further shown in FIG. 7A, liquid removal element 522 may comprise a first liquid removal portion 580, which comprises a squeegee 582 and/or roller 584 or other mechanical structure to remove the carrier fluid 32 (and any other liquid) from the surface of image formation medium 24. In some examples, the electrostatically fixed (e.g. pinned) charged ink particles 34 remain fixed in their respective locations on image formation medium 24 during this physical removal of liquid at least because the electrostatic fixation forces are greater than the shear forces exhibited via the tool(s) used to mechanically remove the carrier fluid 32. In this fifth portion 520, in some examples, at least 80 percent of the jetted carrier fluid 32 on image formation medium 24 is removed. In some examples, at least 90 percent of the jetted carrier fluid 32 is removed. In some examples, at least 95 percent of the jetted carrier fluid 32 is removed. However, in some examples, first liquid removal portion 580 may remove at least 50 percent of total liquid, which includes the carrier fluid 32, from image formation medium 24.

In some such examples, performing such cold liquid removal may substantially decrease the amount of energy used to remove deposited liquid (e.g. from the top of image formation medium 24) as compared to using a heated air dryer primarily or solely to remove the liquid. In some examples, in this context the term "substantially decrease" may correspond to at least 10×, at least 20×, or at least 30×. In addition, using cold liquid removal via example image formation devices (e.g. 20, 200, etc.) may significantly decrease the space or volume occupied by such an example image formation device, thereby reducing its cost and/or cost of space in which the image formation device may reside.

As further shown in FIG. 7B, in some examples the liquid removal element 522 in fifth portion 520 of image formation device 500 (FIG. 5) may comprise a second liquid removal portion 590 which would be located downstream from the first liquid removal portion 580 (FIG. 7A). The second liquid removal portion 590 acts to remove any liquid not removed via first liquid removal portion 580 and thereby result in dried ink particles 34 on the image formation medium 24, as represented via the depictions in dashed lines F in FIG. 5.

As further shown in FIG. 7B, in some examples the second liquid removal portion 590 may comprise a heated air element 592 to direct heated air onto at least any remaining carrier fluid 32, ink particles 34, and first polymer structure 206. In some examples, the heated air is controlled to maintain the ink particles 34, first polymer structure 206, image formation medium 24, etc. at a temperature below 60 degrees C., which may prevent deformation of image formation medium 24 such as cockling, etc.

In some examples, the second liquid removal portion 590 may comprise a radiation element 594 to direct at least one of infrared (IR) radiation and ultraviolet (UV) radiation onto the carrier fluid 32 (and any other excess liquid) and image formation medium 24 to eliminate liquid remaining after operation of the first liquid removal portion 580. In some examples, the second liquid removal portion 590 may sometimes be referred to as an energy transfer mechanism or structure by which energy is transferred to the liquid 32, ink particles 34 and image formation medium 24 in order to dry the ink particles 34 and/or image formation medium 24.

Moreover, it will be understood that in some examples the labeling of the various portions as first, second, third, fourth, fifth portions (e.g. 30, 40, 60, 510, 520, etc.) does not necessarily reflect an absolute ordering or position of the respective portions along the travel path T. Moreover, such labeling of different portions also does not necessarily represent the existence of structural barriers or separation elements between adjacent portions of the image formation devices 10, 500, etc. Furthermore, in some examples, the components of the example image formation devices 10, 500, etc. may be organized into a fewer or greater number of portions than represented in FIGS. 1A, 5, 8A, 9, etc.

With further reference to at least FIG. 5, in some examples media supply 22 may comprise a plurality of rollers to support and guide image formation medium 24 along travel path T. While not shown for illustrative simplicity, additional rollers may be present to support image formation medium 24 throughout each of the different portions of an image formation device. In some examples, these arrangements of rollers may comprise a roll-to-roll arrangement.

In some examples, an image formation device (e.g. 10, 500, etc.) may comprise a preliminary portion (e.g. 710 shown later in FIG. 9) by which some materials or layer may be deposited onto image formation medium 24 prior to the first portion 30 in which droplets 31 of ink particles 34 within carrier fluid 32 are received onto the image formation medium 24. With this in mind, FIG. 8A provides a diagram 600 schematically representing one example developer unit 602 by which such materials or layers may be deposited onto image formation medium 24 prior to receiving droplets 31.

In some examples, the developer unit 602 may comprise at least some of substantially the same features and attributes as a developer unit as would be implemented in a liquid electrophotographic (LEP) printer, such as but not limited to, an Indigo brand liquid electrophotographic printer sold by HP, Inc. In some examples, the developer unit may comprise a binary developer (BID) unit. In some examples, the developer unit 602 may comprise at least some of substantially the same features and attributes of a binary developer (BID) unit as described in Nelson et al. US20180231922.

Figure 8C:
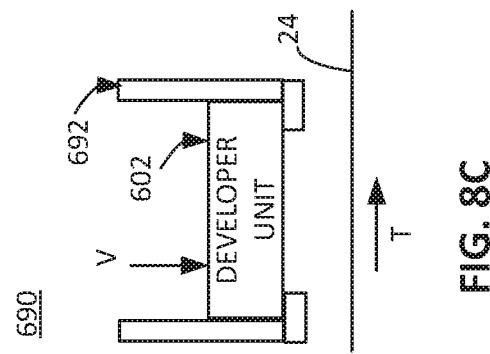
FIG. 8C is a diagram including a side view schematically representing an example developer unit removably inserted into an example receiving structure and/or at least some aspects of an example method of image formation.
Figure 8B:
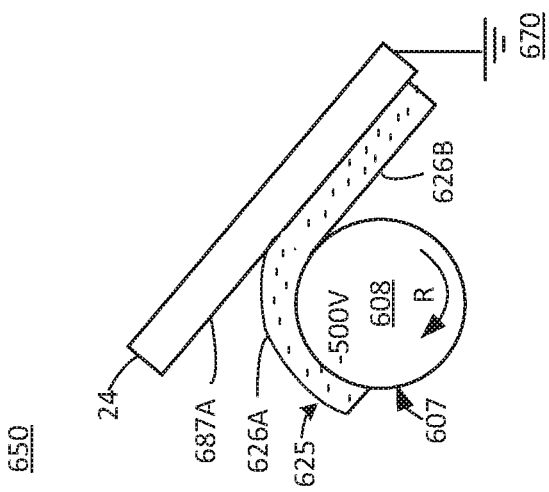
FIGS. 8A and 8B are each a diagram including a side view schematically representing an example image formation medium and an example developer unit of an example image formation device and/or example method of image formation.
Figure 8A:
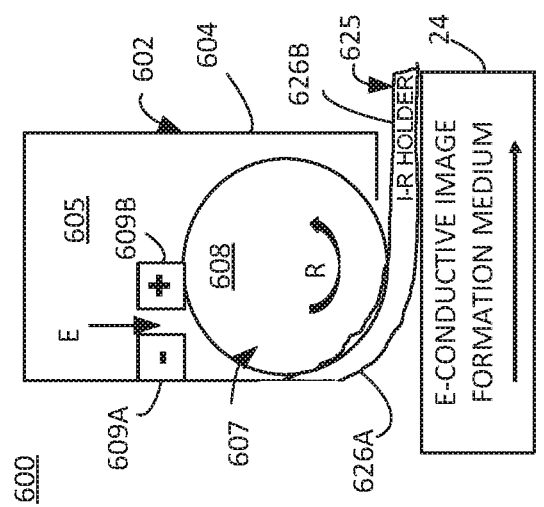

As shown in FIG. 8A, in some examples, the developer unit 602 comprises a container 604 for holding various materials 605 (e.g. liquids and/or solids) from which a formulation is developed into semi-liquid, image-receiving holder layer 625. The materials 605 may comprise binding materials, such as resin particles, dissolved resin, binding polymers (dissolved or as resins), or adhesion promoting materials, as well as materials such as (but not limited to) dispersants, charge directors, mineral oils, foam depressing agents, UV absorbers, cross linking initiators and components, heavy oils, blanket release promoters, and/or scratch resistance additives. In one aspect, the materials 405 in any given formulation of the image-receiving holder layer 625 are combined in a manner such that materials 405 will be flowable in order to enable formation of the image-receiving holder as a layer 625 on image formation medium 24. In some examples, a mineral oil portion of the materials 605 may be more than 50 percent by weight of all the materials 605. In some such examples, the mineral oil portion may comprise an isoparafinic fluid. In some examples, the binding materials may facilitate the electrostatic force fixation of the ink particles 34 relative to at least the image-receiving holder layer 625, as previously described in association with at least FIG. 5.

In some examples, the container 604 may comprise individual reservoirs, valves, inlets, outlets, etc. for separately holding at least some of the materials 605 and then mixing them into a desired paste material to form an image-receiving holder as layer 625. In some examples, the developed paste may comprise at least about 20 percent to about 30 percent solids, which may comprise resin or binder components and may comprise at least charge director additives along with the binder materials. In some examples, the solids and charge director additives are provided within a dielectric carrier fluid, such a non-aqueous fluid, such as but not limited to the above-described isoparafinic fluid.

As further shown in FIG. 8A, the developer unit 602 comprises a roller assembly 607 disposed at least partially within container 604 and selectively exposed to the formulated paste used to form image-receiving holder layer 625. The roller assembly 607 comprises a developer drum 608 (or roller), which is driven to a negative voltage (e.g. −500 V) for electrostatically charging the paste and electrostatically delivering the charged paste as image-receiving holder layer 625 on the image formation medium 24, as shown in FIGS. 8A-8B. In one such example, the paste of materials 605 is negatively charged. In some examples, the charge director additives receive and hold the negative charge in a manner to thereby negatively charge at least the binder materials within the paste of materials 605 when an electrical field is applied to the paste of materials 605, such as via the development roller 608 at an example −500 Volts. Via such example arrangements, the image-receiving holder layer 625 may sometimes be referred to as an electrically charged, image-receiving holder layer.

In some examples, the developer drum or roller 608 may comprise a conductive polymer, such as but not limited to polyurethane or may comprise a metal material, such as but not limited to, Aluminum or stainless steel.

In some examples, the materials 605 may start out within the container 604 (among various reservoirs, supplies) with about 3 percent solids among various liquids, and via a combination of electrodes (e.g. at least 609A, 609B in FIG. 8A) "squeeze" the formulation into a paste of at least about 20 percent solids, as noted above. As shown in at least FIG. 8B, the paste of materials 605 is applied as a layer (onto image formation medium 24 having a thickness of about 4 to about 8 microns, in at least some examples. It will be understood that the volume and/or thickness of the electrically charged, semi-liquid layer (forming image-receiving holder 625) that is transferred from the developer unit 602 to the image formation medium 24 may be controlled based on a voltage (e.g. −500V) of the developer roller 608 and/or a charge level of the solid particles within the paste produced by the developer unit 602.

In some examples, as further described later in association with at least FIG. 12A, among directing other and/or additional operations, a control portion 1000 is instruct, or to cause, the developer unit 602 to apply the electrically charged, semi-liquid image-receiving holder layer 625 onto image formation medium 24, such as within the preliminary portion 310 along the travel path T.

Upon rotation of at least drum 608 of the roller assembly 607, and other manipulations associated with container 605, the drum 608 electrostatically attracts some of the charged developed material to form image-receiving holder layer 625, which is then deposited onto image formation medium 24 as shown in FIGS. 8A-8B.

During such coating, the image-receiving holder layer 625 becomes electrostatically releasably fixed relative to the media. In this arrangement, a first surface 626A (i.e. side) of the image-receiving holder layer 625 faces the image formation medium 24 while an opposite second surface 626B of the image-receiving holder layer 625 faces away from image formation medium 24.

As previously noted, in some examples the image formation medium 24 comprises at least some electrically conductive material (or layer) which facilitates electrostatically attracting the negatively charged paste to complete formation of image-receiving holder layer 625 on a surface 687A of the image formation medium 24, as shown in FIG. 8B. The electrically conductive image formation medium 24 may be electrically connected to an electrical ground 670.

In some examples, the developer unit 602 may comprise a permanent component of an image formation device (e.g. 10, 500, etc.) with the developer unit 602 being sold, shipped, and/or supplied, etc. as part of image formation device. It will be understood that such "permanent" components may be removed for repair, upgrade, etc. as appropriate.

As shown in FIG. 8C, in some examples an image formation device (e.g. 10, 500, etc.) may comprise a receiving structure 692 like receiving structure 550 in FIG. 6A, except to removably receive the developer unit 602 instead of receiving a fluid ejection device 561. Accordingly, in some examples the developer unit 602 is removably insertable into the receiving structure 692, as shown in at least FIG. 8C. In some such examples, the receiving structure 692 is sized, shaped, and positioned relative to image formation medium 24, as well as relative to other components of image formation device (e.g. 10, 500, etc.), such that upon removable insertion into to receiving structure 692 (as represented by arrow V in FIG. 8C), the developer unit 602 is positioned to deliver the image-receiving holder layer 625 onto image formation medium 24.

In some examples, the developer unit 602 may comprise a consumable which is periodically replaceable due to wear, exhaustion of a supply of materials, developer components, etc. In some such examples, the developer unit 602 may be sold, supplied, shipped, etc. separately from the rest of an image formation device (e.g. 10, 500 etc.) and then installed into the respective image formation device upon preparation for use of the image formation device at a particular location. Accordingly, it will be apparent that in some examples the receiving structure 692 may comprise part of the preliminary portion 710 of image formation device 700 in FIG. 9A or otherwise precede the first portion 30 in the other example image formation devices.

When the developer unit 602 is present, in some examples its operation may comprise developing the image-receiving holder layer 625 without any color pigments in the image-receiving holder layer 625, such that the image-receiving holder layer 625 may sometimes be referred to as being colorless. In this arrangement, the image-receiving holder layer 25 corresponds to a liquid-based ink formulation which comprises at least some of substantially the same components as used in liquid electrophotographic (LEP) process, except for omitting the color pigments. In addition to being colorless in some examples, the material used to form the image-receiving holder layer also may be transparent and/or translucent upon application to an image formation medium.

In some examples, the image-receiving holder layer 625 may comprise some color pigments so as to provide a tint. In some such examples, such color pigments may be transparent or translucent as well so as to not interfere with, or otherwise, affect the formation or appearance of an image via the ink particles 34 deposited via a fluid ejection device (e.g. 561).

In at least some examples in which the image-receiving holder layer 625 omits color pigments, the materials of the image-receiving holder layer 625 effectively do not comprise part of the image resulting from the deposited color ink particles which will be later transferred (with the image-receiving holder layer 625) onto an image formation medium. Accordingly, in some such examples the image-receiving holder layer 625 also may sometimes be referred to as a non-imaging, image-receiving holder layer 625.

In some such examples, the image-receiving holder layer 625 comprises all (e.g. 100 percent) of the binder used to form an image (including ink particles 34) on image formation medium 24. In some such examples, image-receiving holder layer 625 comprises at least substantially all (e.g. substantially the entire volume) of the binder used to form the image (including ink particles). In some such examples, in this context the term "at least substantially all" (or at least substantially the entire) comprises at least 95%. In some such examples "at least substantially all" (or at least substantially the entire) comprises at least 98%. In some examples in which the image-receiving holder layer 625 may comprise less than 100 percent of the binder used to form the image on the image formation medium 24 (and later on an image formation medium), the remaining desired amount of binder may form part of droplets 31 delivered in the first portion 30 of an image formation device (e.g. 10, 500 etc.). It will be understood that the term binder may encompass resin, binder materials, and/or polymers, and the like to complete image formation with the ink particles 34. In some examples, a mineral oil portion of the materials 605 (which includes the binder) may be more than 50 percent by weight of all the materials 605.

As further noted below, formulating the image-receiving holder layer 625 to comprise at least substantially all of the binder material(s) to be used to form an image on the image formation medium (and later on an image formation medium) acts to free the first portion 30 (and fluid ejection device 561) so that, in at least some examples, the droplets 31 may omit any binder material, and therefore be "binder-free" at least with respect to securing the ink particles 34 relative to the image formation medium 24. Accordingly, in some examples, the droplets 31 may sometimes be referred to as being binder-free droplets.

In some examples, the droplets 31 omit charge director additives and therefore may sometimes be referred to as being charge-director-free. In some such examples, the image-receiving holder layer 625 may comprise some charge-director additives.

This example arrangement of supplying all or substantially all of the binder (for forming the image) via the image-receiving holder layer 625 may help to operate a fluid ejection device (e.g. 561 in FIGS. 6A-6B) with fewer maintenance issues because the absence (or nearly complete absence) of a binder in the droplets 312 may avoid fouling the ejection elements, which may sometimes occur with droplets 31 including binder material for forming an image on an image formation medium. In addition to simplifying maintenance, this arrangement may increase a longevity of the ejection elements (e.g. printhead) of the fluid ejection device.

In some examples, the developer unit 602 is to apply the image-receiving holder layer 625 in a volume to cover at least substantially the entire surface of the image formation medium 24 in at least the area in which the image is be formed on image formation medium 24 and immediately surrounding regions. In some examples, in this context, the term "substantially the entire" comprises at least 95 percent, while in some examples, the term "substantially the entire" comprises at least 99 percent.

In some examples, the image-receiving holder layer 625 is applied to form a uniform layer covering an entire surface of the image formation medium 24 (at least including the area in which an image is to be formed). This arrangement stands in sharp contrast to some liquid electrophotographic printers in which liquid ink (with color pigments) is applied just to areas of a charged photo imaging plate (PIP), which have been discharged in a pattern according to the image to be formed. Accordingly, the application of a uniform layer (covering an entire surface of the image formation medium 24) of the image-receiving holder layer 625 in the example image formation devices bears no particular relationship to the pattern of an image to be formed on the image-receiving holder layer 625. Therefore, in some instances, the image-receiving holder layer 625 may sometimes be referred to as a non-imaging, image-receiving holder layer 625.

FIG. 9A is a diagram including a side view schematically representing an example image formation device 700 and/or an example method of image formation.

In some examples, the image formation device 700 comprises at least some of substantially the same features and attributes as the previously described example image formation devices (e.g. 10, 500) in FIGS. 1A-8C.

As shown in FIG. 9A, in some examples the image formation device 700 comprises an image formation medium 24, a preliminary portion 710, a first portion 30, fourth portion 510, fifth portion 520, second portion 40, and sixth portion 715, etc. The sixth portion 715 may comprise one example implementation of at least some of substantially the same features and attributes as third portion 60 (FIG. 1A).

Operation of the image formation device 700 results in a printed medium assembly 790 as shown in FIG. 9B and which comprises a second polymer structure 737 covering and bonding an image formed via ink particles 34 on an image-receiving holder layer 625 on an image formation medium 24. In some examples, the preliminary portion 710 and/or at least first, second, fourth, fifth portions (30, 40, 510, 520) and sixth portion 715 (e.g. third portion 60 in FIG. 1A) comprise at least some of substantially the same features and attributes as previously described in association with at least FIGS. 1A-8C.

As further shown in FIG. 9A, in some examples the preliminary portion 710 of image formation device 70 is to receive a coating of material on the image formation medium 24 to form an image-receiving holder layer 625 in a manner substantially the same as described in association with at least FIGS. 8A-8B.

It will be understood that the image formation medium 24 may be moved along travel path T via support from an array of rollers, tensioners, and related mechanisms to maintain tension and provide direction to image formation medium 24 in its movement along travel path T.

In a manner consistent with the previously-described example image formation devices, electrostatic fixation of ink particles 34 occurs relative to the image-receiving holder layer 625, thereby ensuring that the ink particles 34 remain in their targeted locations to form an image. In some examples, the electrostatic fixation occurs relative to the charged binder material in the image-receiving holder layer 625.

As further shown in FIG. 9A, in some examples image formation device 700 may further comprise the previously noted sixth portion 715 downstream from at least the liquid removal element 522. Via at least a roller (e.g. drum) 704, heat and pressure is applied while securing a second polymer structure 737 relative to the layer of ink solids (e.g. particles 34), image-receiving holder layer 625, and image formation medium 24. In some such examples, this action may comprise laminating. Moreover, in some such examples, electrical bias also may be used in combination with heat and/or pressure in order to effect the above-described securing action of the second polymer structure 737.

In some examples, as shown in FIG. 9B, in a completed image formation medium assembly 790 the image made of a pattern(s) of ink particles 34 is at least partially sandwiched between the image formation medium 24 (with image-receiving holder layer 625 thereon) and the second polymer structure 737. In some such examples, some portions of the respective image-receiving holder layer 625 and the second polymer structure 737 may be in direct contact with each other, as shown in FIG. 9B in one example. As previously noted, in some examples the image-receiving holder layer 625 may comprise one example implementation of at least a portion a first polymer structure (e.g. 206 in FIG. 2A-2B).

In some examples, the image-receiving holder 625 may sometimes be referred to as an image-receiving medium. In some examples, the semi-liquid image-receiving holder may sometimes be referred to as a paste, a semi-liquid base, semi-solid base, or base layer.

Figure 10:
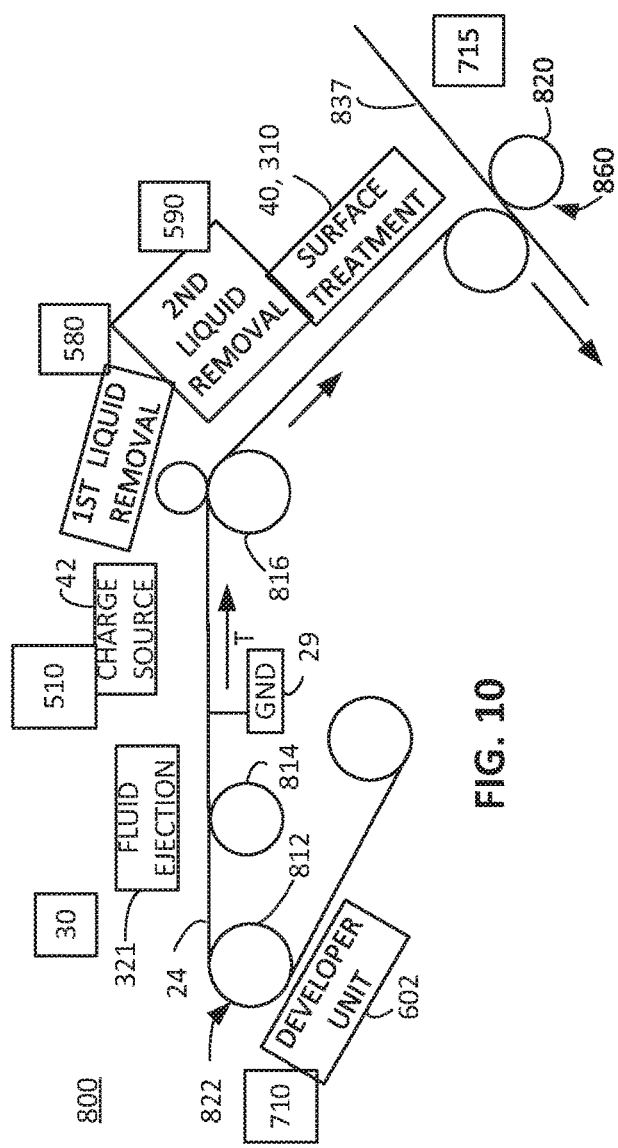
FIGS. 10-11 each include a diagram including a side view schematically representing an example image formation device and/or method.

FIG. 10 is a diagram including a side view schematically representing at least a portion of an example image formation device 800. In some examples, image formation device 800 comprises at least some of substantially the same features as the image formation devices as previously described in association with FIGS. 1A-9B. For illustrative simplicity, the various portions (e.g. 30, 40, 60, 510, etc.) of image formation device 800 are represented via boxes instead of dashed lines as in the earlier example Figures.

In some examples, image formation device 800 may comprise various rollers 812, 814, 816, etc. and related mechanisms to guide and support travel of image formation medium 824 along travel path T and through the various portions of image formation device 800.

As shown in FIG. 10, in some examples a sixth portion 715 may comprise a cylinder 820 (like roller 704 in FIG. 9A) and/or other rollers to implement the previously described third portion 60 (e.g. FIG. 1A) to apply a second polymer structure 837 or other cover layer. In some examples, the sixth portion 715 may sometimes be referred to as finishing station, and with the elements in sixth portion 715 in FIG. 10 comprising at least a partial example implementation of the finishing element 69 in FIG. 1C and/or elements in third portion 60 in FIG. 1A.

With this example arrangement, as further shown in FIG. 10 a surface treatment may be applied prior to the sixth portion 715 in order to increase the peel strength of a completed image formation medium assembly, in a manner similar to the previously described examples.

Figure 11:
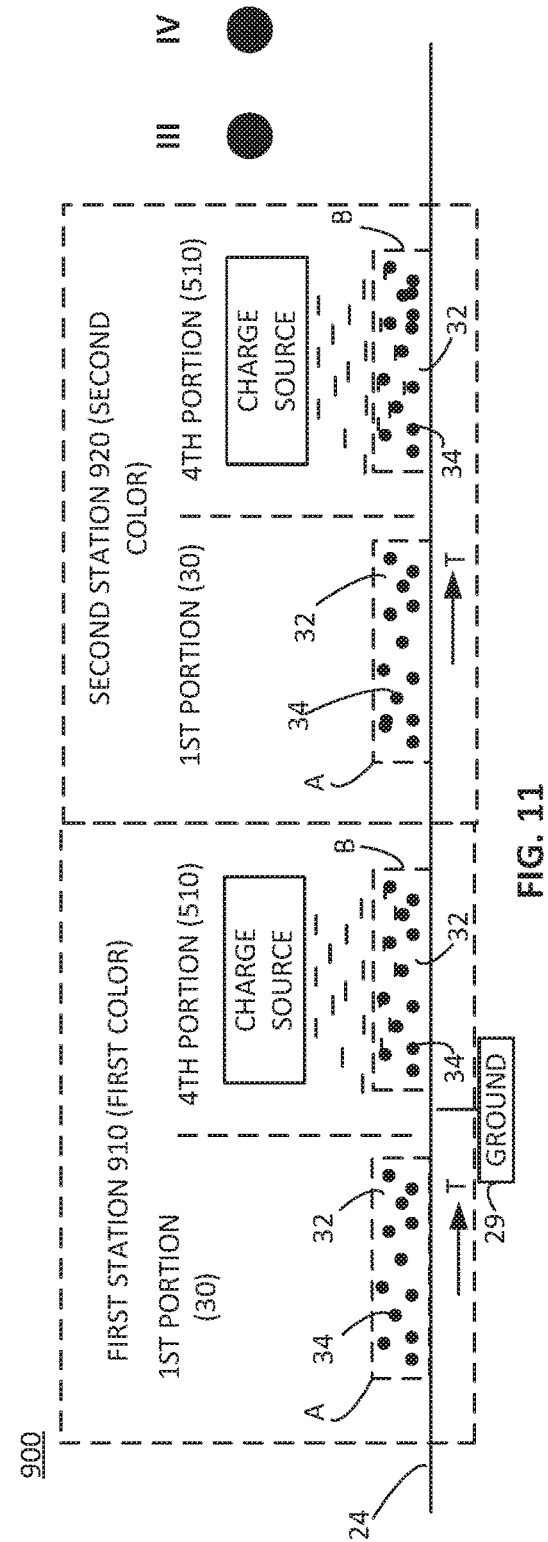

FIG. 11 is a diagram including a side view schematically representing an example image formation device 900. In some examples, the image formation device 900 comprises a media supply and a series of stations arranged along the travel path of the media in which each station is to provide one color ink of a plurality of different color inks onto the media. It will be further understood that FIG. 11 also may be viewed as schematically representing at least some aspects of an example method of image formation.

In some examples, the image formation device 900 comprises at least some of substantially the same features and attributes as the devices 10, 500 etc., and portions, components, thereof, as previously described in association with FIGS. 1A-10. However, in image formation device 900 a series of image formation stations 910, 920, etc. is provided along a travel path of the image formation medium 24. In some examples, each different image formation station 910, 920, etc. provides for at least partial formation of an image on image formation medium 24 by a respectively different color ink. Stated differently, the different stations apply different color inks such that a composite of the differently colored applied inks forms a complete image on image formation medium 24 as desired. In some examples, the different color inks correspond to the different colors of a color separation scheme, such as Cyan (C), Magenta (M), Yellow (Y), and black (K) wherein each different color is applied separately as a layer to the image formation medium 24 as image formation medium 24 moves along travel path T.

As shown in FIG. 11, each station 910, 920, etc. may comprise at least a first portion 30 and a fourth portion 510 having substantially the same features as previously described. In some examples, each station may comprise additional portions, such as but not limited to, fifth portion 520 (FIG. 5) for liquid removal. In some examples, the first station 910 is preceded by a preliminary portion 710 (FIG. 9A).

As further shown in FIG. 11, the image formation device 900 may comprise additional stations, and as such, the black circles III, IV represent further stations like stations 910, 920 for applying additional different color inks onto image formation medium 24. In some examples, the additional stations may comprise a fewer number or a greater number of additional stations (e.g. III, IV) than shown in FIG. 11.

It will be understood that in some examples, following a series of such stations (e.g. 910, 920, etc.) the image formation device 900 may comprise a fifth portion 520, second portion 40, third portion 60 such that the overall arrangement comprises at least some of substantially the same features as described in association with at least FIGS. 1A-10 to produce a completed image formation medium assembly, such as shown in FIGS. 2B, 9B, which comprises increased peel strength arising from one of the previously described surface treatments (e.g. 40 in FIG. 1A, 310 in FIG. 3).

Figure 12A:
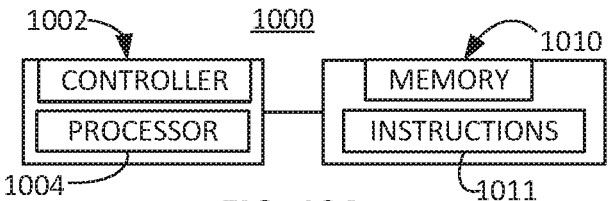
FIGS. 12A and 12B are a block diagram schematically representing an example control portion and an example user interface, respectively.

FIG. 12A is a block diagram schematically representing an example control portion 1000. In some examples, control portion 1000 provides one example implementation of a control portion forming a part of, implementing, and/or generally managing the example image formation devices (e.g. 10, 500, 700, 800, 900) including as the particular portions, elements, devices, user interface, instructions, engines, and/or methods, as described throughout examples of the present disclosure in association with FIGS. 1A-11 and 12B-13.

In some examples, control portion 1000 includes a controller 1002 and a memory 1010. In general terms, controller 1002 of control portion 1000 comprises at least one processor 1004 and associated memories. The controller 1002 is electrically couplable to, and in communication with, memory 1010 to generate control signals to direct operation of at least some the image formation devices, various portions and elements of the image formation devices, fluid ejection devices, developer units, charge generation elements, liquid removal portions, finishing elements, user interfaces, instructions, engines, functions, and/or methods, as described throughout examples of the present disclosure. In some examples, these generated control signals include, but are not limited to, employing instructions 1011 stored in memory 1010 to at least direct and manage depositing droplets of ink particles and carrier fluid to form an image on a media, directing charges onto ink particles, removing liquids, applying adhesion-promoting surface treatments, applying finish treatments, etc. as described throughout the examples of the present disclosure in association with FIGS. 1A-11 and 12B-13. In some instances, the controller 1002 or control portion 1000 may sometimes be referred to as being programmed to perform the above-identified actions, functions, etc. In some examples, at least some of the stored instructions 1011 are implemented as an, or may be referred to as, a print engine or image formation engine.

In response to or based upon commands received via a user interface (e.g. user interface 1020 in FIG. 12B) and/or via machine readable instructions, controller 1002 generates control signals as described above in accordance with at least some of the examples of the present disclosure. In some examples, controller 1002 is embodied in a general purpose computing device while in some examples, controller 1002 is incorporated into or associated with at least some of the image formation devices, portions or elements along the travel path, fluid ejection devices, developer unit, charge generation elements, liquid removal portions, surface treatment applicators, finishing elements, user interfaces, instructions, engines, functions, and/or methods, etc. as described throughout examples of the present disclosure.

For purposes of this application, in reference to the controller 1002, the term "processor" shall mean a presently developed or future developed processor (or processing resources) that executes machine readable instructions contained in a memory or that includes circuitry to perform computations. In some examples, execution of the machine readable instructions, such as those provided via memory 1010 of control portion 1000 cause the processor to perform the above-identified actions, such as operating controller 1002 to implement the formation of an image as generally described in (or consistent with) at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium), as represented by memory 1010. The machine readable instructions may include a sequence of instructions, a processor-executable machine learning model, or the like. In some examples, memory 1010 comprises a computer readable tangible medium providing non-volatile storage of the machine readable instructions executable by a process of controller 1002. In some examples, the computer readable tangible medium may sometimes be referred to as, and/or comprises a computer program product. In other examples, hard wired circuitry may be used in place of or in combination with machine readable instructions to implement the functions described. For example, controller 1002 may be embodied as part of at least one application-specific integrated circuit (ASIC), at least one field-programmable gate array (FPGA), and/or the like. In at least some examples, the controller 1002 is not limited to any specific combination of hardware circuitry and machine readable instructions, nor limited to any particular source for the machine readable instructions executed by the controller 1002.

In some examples, control portion 1000 may be entirely implemented within or by a stand-alone device.

In some examples, the control portion 1000 may be partially implemented in one of the image formation devices and partially implemented in a computing resource separate from, and independent of, the image formation devices but in communication with the image formation devices. For instance, in some examples control portion 1000 may be implemented via a server accessible via the cloud and/or other network pathways. In some examples, the control portion 1000 may be distributed or apportioned among multiple devices or resources such as among a server, an image formation device, and/or a user interface.

Figure 12B:
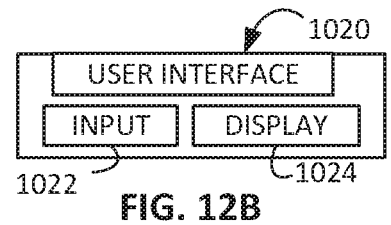

In some examples, control portion 1000 includes, and/or is in communication with, a user interface 1020 as shown in FIG. 12B. In some examples, user interface 1020 comprises a user interface or other display that provides for the simultaneous display, activation, and/or operation of at least some of the image formation devices, portions, elements, user interfaces, instructions, engines, functions, and/or methods, etc. as described in association with FIGS. 1A-11 and 12B-13. In some examples, at least some portions or aspects of the user interface 1020 are provided via a graphical user interface (GUI), and may comprise a display 1024 and input 1022.

Figure 13:
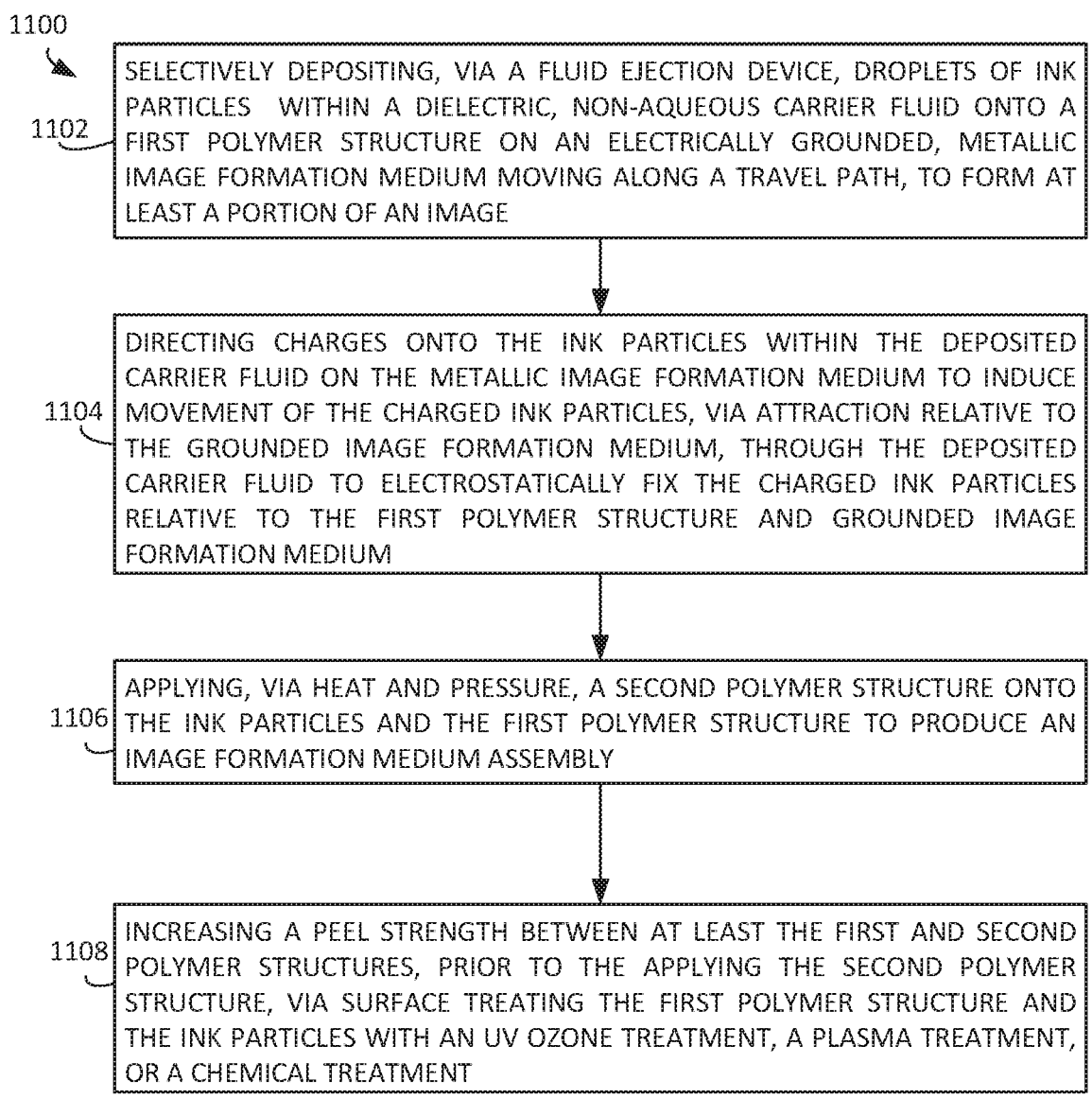
FIG. 13 is a flow diagram schematically representing an example method of image formation.

FIG. 13 is a flow diagram schematically representing an example method. In some examples, method 1100 may be performed via at least some of the same or substantially the same devices, portions, stations, elements, control portion, user interface, etc. as previously described in association with FIGS. 1A-12B. In some examples, method 1100 may be performed via at least some devices, portions, stations, elements, control portion, user interface, etc. other than those previously described in association with FIGS. 1A-12B.

In some examples, as shown at 1102 in FIG. 13, method 1100 comprises selectively depositing, via a fluid ejection device, droplets of ink particles within a dielectric, non-aqueous carrier fluid onto a first polymer structure on an electrically grounded, metallic image formation medium moving along a travel path, to form at least a portion of an image.

In some examples, as shown at 1104 in FIG. 13, method 1100 comprises directing charges onto the ink particles within the deposited carrier fluid on the metallic image formation medium to induce movement of the charged ink particles, via attraction relative to the grounded image formation medium, through the deposited carrier fluid to electrostatically fix the charged ink particles relative to the first polymer structure and grounded image formation medium.

As shown in FIG. 13 at 1106, in some examples method 1100 comprises applying, via heat and pressure, a second polymer structure onto the charged ink particles, the first polymer structure, and the image formation medium to produce an image formation medium assembly; and As shown in FIG. 13 at 1108, in some examples method 1100 comprises increasing a peel strength between the first polymer structure (including the ink particles thereon) and the second polymer structure via, prior to the applying, surface treating the first polymer structure and the ink particles with an UV ozone treatment, a plasma treatment, or a chemical treatment.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A device comprising:
   a supply to supply a metallized, non-absorptive media along a travel path, which is electrically connectable to a ground element, the metallized media to carry a first polymer structure;
   a first portion along the travel path to receive droplets of ink particles within a dielectric, non-aqueous carrier fluid on the first polymer structure on the media to form an image; and
   a second portion to apply an adhesion-promoting surface treatment onto the ink particles and the first polymer structure, the surface treatment comprising an UV ozone treatment, a plasma treatment, or a chemical treatment; and
   a third portion to apply, via heat and pressure, a second polymer structure onto the ink particles and the first polymer structure to produce a media assembly.

2. The device of claim 1, wherein the plasma treatment comprises one of an atmospheric corona discharge treatment, an oxygen plasma treatment, a nitrogen plasma treatment, and argon plasma treatment.

3. The device of claim 1, wherein the chemical treatment comprises at least one of a silane treatment, a titanate treatment, and a zirconate material.

4. The device of claim 1, wherein the adhesion-promoting surface treatment is to substantially increase a peel-strength of the second polymer structure relative to the both the first polymer structure and the ink particles of the media assembly.

5. The device of claim 1, comprising:
   a fourth portion upstream from the first portion to receive an electrically charged, semi-liquid image-receiving holder onto the media, wherein the image-receiving holder comprises a binder material and the droplets are substantially binder-material-free, and wherein the image-receiving holder comprises at least a portion of the first polymer structure.

6. The device of claim 5, comprising:
   a fifth portion between the first portion and the second portion, and including a charge generation portion to emit airborne charges to charge the ink particles to move, via attraction relative to the grounded media, through the carrier fluid toward the media to become electrostatically fixed relative to the first polymer structure and the media.

7. The device of claim 1, wherein the first portion comprises a receiving structure to removable receive a fluid ejection device, which comprises a drop-on-demand fluid ejection device to eject the droplets of ink particles within the dielectric carrier fluid to be received on the non-absorptive media.

8. The device of claim 1, comprising at least one of:
a first liquid removal portion downstream along the travel path from the first portion to mechanically remove at least a portion of the carrier fluid from the media; and
a second liquid removal portion downstream from the first liquid removal portion and including:
   a heated air element to direct heated air onto at least one of the carrier fluid and the media; or
   a radiation device to direct at least one of IR radiation and UV radiation onto at least the carrier fluid and media.

9. A device comprising:
a control portion;
a media supply to supply a non-absorptive media along a travel path and to which a ground element is to be electrically connected; and
a series of stations arranged along the travel path of the media in which each station is to provide one color ink of a plurality of different color inks onto the media, and wherein each station comprises:
   a first portion in which the control portion is to cause a fluid ejection device to deliver droplets of ink particles within a dielectric, non-aqueous carrier fluid on the media to form at least a portion of an image; and
   a second portion including a charge generation portion to emit airborne charges to charge the delivered ink particles, via attraction relative to the grounded media, to move through the carrier fluid toward the grounded media to become electrostatically fixed relative to a first polymer structure and media; and
a third portion to apply a peel-strength-promoting surface treatment, onto the ink particles and the first polymer structure, the surface treatment comprising an UV ozone treatment, a plasma treatment, or a chemical treatment, the chemical treatment comprising at least one of a silane material, a titanate material, and a zirconate material; and
a fourth portion to apply heat and pressure to secure a second polymer structure to the ink particles, the first polymer structure, and the grounded media to produce a media assembly comprising the formed image.

10. The device of claim 9, comprising:
a fifth portion upstream from the first portion to receive an electrically charged, semi-liquid image-receiving holder onto the grounded media prior to receipt of droplets, wherein the image-receiving holder comprises a binder and the droplets are substantially binder free.

11. The device of claim 9, comprising:
at least one liquid removal portion downstream from at least a last respective station and including at least one of:
   a mechanical removal structure to physically remove carrier fluid on the first polymer structure and the media; and
   an energy transfer mechanism to cause evaporation of carrier fluid on the first polymer structure and the media.

12. A method comprising:
selectively depositing, via a fluid ejection device, droplets of ink particles within a dielectric, non-aqueous carrier fluid onto a first polymer structure on an electrically grounded, metallic image formation medium moving along a travel path, to form at least a portion of an image;
directing charges onto the ink particles within the deposited carrier fluid on the metallic image formation medium to induce movement of the charged ink particles, via attraction relative to the grounded image formation medium, through the deposited carrier fluid to electrostatically fix the charged ink particles relative to the first polymer structure and grounded image formation medium;
applying, via heat and pressure, a second polymer structure onto the charged ink particles, the first polymer structure, and the image formation medium to produce an image formation medium assembly; and
increasing a peel strength between at least the first and second polymer structures via, prior to the applying, surface treating the first polymer structure and the ink particles with an UV ozone treatment, a plasma treatment, or a chemical treatment.

13. The method of claim 12, wherein the plasma treatment comprises one of an atmospheric corona discharge treatment, an oxygen plasma treatment, a nitrogen plasma treatment, and an argon plasma treatment, and wherein the chemical treatment comprises one of a silane treatment, a titanate treatment, and a zirconate material.

14. The method of claim 12, comprising:
after the directing charges and prior to the surface treating, mechanically removing at least a first portion of the carrier fluid; and
after the mechanical removal, further removing any remaining portion of the carrier fluid via at least one of heated air and radiation.

15. The method of claim 12, comprising:
prior to the selective depositing, applying an electrically charged, semi-liquid image-receiving holder onto the image formation medium, including forming the image-receiving holder to include a binder, and the droplets are substantially binder-free, and wherein the image receiving holder comprises at least a portion of the first polymer structure.

* * * * *